US010422899B2

(12) United States Patent (10) Patent No.: US 10,422,899 B2
Bansal et al. (45) Date of Patent: Sep. 24, 2019

(54) HARMONIC ENCODING FOR FWI

(71) Applicants: Reeshidev Bansal, Spring, TX (US); Pavel Dimitrov, Houston, TX (US)

(72) Inventors: Reeshidev Bansal, Spring, TX (US); Pavel Dimitrov, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 597 days.

(21) Appl. No.: 14/790,527

(22) Filed: Jul. 2, 2015

(65) Prior Publication Data

US 2016/0033661 A1 Feb. 4, 2016

Related U.S. Application Data

(60) Provisional application No. 62/031,096, filed on Jul. 30, 2014.

(51) Int. Cl.
*G01V 1/28* (2006.01)
*G01V 1/00* (2006.01)
*G01V 1/30* (2006.01)

(52) U.S. Cl.
CPC ............. *G01V 1/282* (2013.01); *G01V 1/005* (2013.01); *G01V 1/306* (2013.01); (Continued)

(58) Field of Classification Search
CPC ........ G01V 1/282; G01V 1/005; G01V 1/306; G01V 2210/1214; G01V 2210/622; G01V 2210/675; G01V 2210/614
See application file for complete search history.

(56) References Cited

U.S. PATENT DOCUMENTS 3,812,457 A 5/1974 Weller
3,864,667 A 2/1975 Bahjat
(Continued)

FOREIGN PATENT DOCUMENTS

CA 2 796 631 11/2011
EP 1 094 338 4/2001
(Continued)

OTHER PUBLICATIONS

Krebs et al, Fast full-wavefield seismic inversion using encoded sources, Geophysics. vol. 74, No. 6 Nov.-Dec. 2009 p. 177-188.*
(Continued)

*Primary Examiner* — Rehana Perveen
*Assistant Examiner* — Chuen-Meei Gan
(74) *Attorney, Agent, or Firm* — ExxonMobil Upstream Research Company—Law Department

(57) ABSTRACT

A deterministic method for selecting a set of encoding weights for simultaneous encoded-source inversion of seismic data that will cause the iterative inversion to converge faster than randomly chosen weights. The encoded individual source gathers are summed (83), forming a composite gather, and simulated in a single simulation operation. The invention creates multiple realizations of the simulation (84), each with its own encoding vector (82) whose components are the weights for the shots in the composite gather. The encoding vectors of the invention are required to be orthogonal (82), which condition cannot be satisfied by random weights, and in various embodiments of the invention are related to eigenvectors of a Laplacian matrix, sine or cosine functions, or Chebyshev nodes as given by the roots of Chebyshev polynomials. For non-fixed receiver geometry, an encoded mask (61) may be used to approximately account for non-listening receivers.

10 Claims, 9 Drawing Sheets

Mask Encoding: Uses double encoding: (1) encoding for masking, and (2) encoding for simultaneous gradient. Savings come computing fewer forward simulations than hybrid method (M<N).

$$AdjSrc \approx \sum_i c_i * (Mask_i(Sim_i) - Data_i)$$

(52) U.S. Cl.
CPC ............... *G01V 2210/1214* (2013.01); *G01V 2210/614* (2013.01); *G01V 2210/622* (2013.01); *G01V 2210/675* (2013.01)

(56) References Cited

U.S. PATENT DOCUMENTS

| | | | |
|---|---|---|---|
| 4,159,463 | A | 6/1979 | Silverman |
| 4,168,485 | A | 9/1979 | Payton et al. |
| 4,545,039 | A | 10/1985 | Savit |
| 4,562,650 | A | 1/1986 | Nagasawa et al. |
| 4,575,830 | A | 3/1986 | Ingram et al. |
| 4,594,662 | A | 6/1986 | Devaney |
| 4,636,957 | A | 1/1987 | Vannier et al. |
| 4,675,851 | A | 6/1987 | Savit et al. |
| 4,686,654 | A | 8/1987 | Savit |
| 4,707,812 | A | 11/1987 | Martinez |
| 4,715,020 | A | 12/1987 | Landrum, Jr. |
| 4,766,574 | A | 8/1988 | Whitmore et al. |
| 4,780,856 | A | 10/1988 | Becquey |
| 4,823,326 | A | 4/1989 | Ward |
| 4,924,390 | A | 5/1990 | Parsons et al. |
| 4,953,657 | A | 9/1990 | Edington |
| 4,969,129 | A | 11/1990 | Currie |
| 4,982,374 | A | 1/1991 | Edington et al. |
| 5,260,911 | A | 11/1993 | Mason et al. |
| 5,469,062 | A | 11/1995 | Meyer, Jr. |
| 5,583,825 | A | 12/1996 | Carrazzone et al. |
| 5,677,893 | A | 10/1997 | de Hoop et al. |
| 5,715,213 | A | 2/1998 | Allen |
| 5,717,655 | A | 2/1998 | Beasley |
| 5,719,821 | A | 2/1998 | Sallas et al. |
| 5,721,710 | A | 2/1998 | Sallas et al. |
| 5,790,473 | A | 8/1998 | Allen |
| 5,798,982 | A | 8/1998 | He et al. |
| 5,822,269 | A | 10/1998 | Allen |
| 5,838,634 | A | 11/1998 | Jones et al. |
| 5,852,588 | A | 12/1998 | de Hoop et al. |
| 5,878,372 | A | 3/1999 | Tabarovsky et al. |
| 5,920,838 | A | 7/1999 | Norris et al. |
| 5,924,049 | A | 7/1999 | Beasley et al. |
| 5,999,488 | A | 12/1999 | Smith |
| 5,999,489 | A | 12/1999 | Lazaratos |
| 6,014,342 | A | 1/2000 | Lazaratos |
| 6,021,094 | A | 2/2000 | Ober et al. |
| 6,028,818 | A | 2/2000 | Jeffryes |
| 6,058,073 | A | 5/2000 | VerWest |
| 6,125,330 | A | 9/2000 | Robertson et al. |
| 6,219,621 | B1 | 4/2001 | Hornbostel |
| 6,225,803 | B1 | 5/2001 | Chen |
| 6,311,133 | B1 | 10/2001 | Lailly et al. |
| 6,317,695 | B1 | 11/2001 | Zhou et al. |
| 6,327,537 | B1 | 12/2001 | Ikelle |
| 6,374,201 | B1 | 4/2002 | Grizon et al. |
| 6,381,543 | B1 | 4/2002 | Guerillot et al. |
| 6,388,947 | B1 | 5/2002 | Washbourne et al. |
| 6,480,790 | B1 | 11/2002 | Calvert et al. |
| 6,522,973 | B1 | 2/2003 | Tonellot et al. |
| 6,545,944 | B2 | 4/2003 | de Kok |
| 6,549,854 | B1 | 4/2003 | Malinverno et al. |
| 6,574,564 | B2 | 6/2003 | Lailly et al. |
| 6,593,746 | B2 | 7/2003 | Stolarczyk |
| 6,662,147 | B1 | 12/2003 | Fournier et al. |
| 6,665,615 | B2 | 12/2003 | Van Riel et al. |
| 6,687,619 | B2 | 2/2004 | Moerig et al. |
| 6,687,659 | B1 | 2/2004 | Shen |
| 6,704,245 | B2 | 3/2004 | Becquey |
| 6,714,867 | B2 | 3/2004 | Meunier |
| 6,735,527 | B1 | 5/2004 | Levin |
| 6,754,590 | B1 | 6/2004 | Moldoveanu |
| 6,766,256 | B2 | 7/2004 | Jeffryes |
| 6,826,486 | B1 | 11/2004 | Malinverno |
| 6,836,448 | B2 | 12/2004 | Robertsson et al. |
| 6,842,701 | B2 | 1/2005 | Moerig et al. |
| 6,859,734 | B2 | 2/2005 | Bednar |
| 6,865,487 | B2 | 3/2005 | Charron |
| 6,865,488 | B2 | 3/2005 | Moerig et al. |
| 6,876,928 | B2 | 4/2005 | Van Riel et al. |
| 6,882,938 | B2 | 4/2005 | Vaage et al. |
| 6,882,958 | B2 | 4/2005 | Schmidt et al. |
| 6,901,333 | B2 | 5/2005 | Van Riel et al. |
| 6,903,999 | B2 | 6/2005 | Curtis et al. |
| 6,905,916 | B2 | 6/2005 | Bartsch et al. |
| 6,906,981 | B2 | 6/2005 | Vauge |
| 6,927,698 | B2 | 8/2005 | Stolarczyk |
| 6,944,546 | B2 | 9/2005 | Xiao et al. |
| 6,947,843 | B2 | 9/2005 | Fisher et al. |
| 6,970,397 | B2 | 11/2005 | Castagna et al. |
| 6,977,866 | B2 | 12/2005 | Huffman et al. |
| 6,999,880 | B2 | 2/2006 | Lee |
| 7,046,581 | B2 | 5/2006 | Calvert |
| 7,050,356 | B2 | 5/2006 | Jeffryes |
| 7,069,149 | B2 | 6/2006 | Goff et al. |
| 7,027,927 | B2 | 7/2006 | Routh et al. |
| 7,072,767 | B2 | 7/2006 | Routh et al. |
| 7,092,823 | B2 | 8/2006 | Lailly et al. |
| 7,110,900 | B2 | 9/2006 | Adler et al. |
| 7,184,367 | B2 | 2/2007 | Yin |
| 7,230,879 | B2 | 6/2007 | Herkenoff et al. |
| 7,271,747 | B2 | 9/2007 | Baraniuk et al. |
| 7,330,799 | B2 | 2/2008 | Lefebvre et al. |
| 7,337,069 | B2 | 2/2008 | Masson et al. |
| 7,373,251 | B2 | 5/2008 | Hamman et al. |
| 7,373,252 | B2 | 5/2008 | Sherrill et al. |
| 7,376,046 | B2 | 5/2008 | Jeffryes |
| 7,376,539 | B2 | 5/2008 | Lecomte |
| 7,400,978 | B2 | 7/2008 | Langlais et al. |
| 7,436,734 | B2 | 10/2008 | Krohn |
| 7,480,206 | B2 | 1/2009 | Hill |
| 7,584,056 | B2 | 9/2009 | Koren |
| 7,599,798 | B2 | 10/2009 | Beasley et al. |
| 7,602,670 | B2 | 10/2009 | Jeffryes |
| 7,616,523 | B1 | 11/2009 | Tabti et al. |
| 7,620,534 | B2 | 11/2009 | Pita et al. |
| 7,620,536 | B2 | 11/2009 | Chow |
| 7,646,924 | B2 | 1/2010 | Donoho |
| 7,672,194 | B2 | 3/2010 | Jeffryes |
| 7,672,824 | B2 | 3/2010 | Dutta et al. |
| 7,675,815 | B2 | 3/2010 | Saenger et al. |
| 7,679,990 | B2 | 3/2010 | Herkenhoff et al. |
| 7,684,281 | B2 | 3/2010 | Vaage et al. |
| 7,710,821 | B2 | 5/2010 | Robertsson et al. |
| 7,715,985 | B2 | 5/2010 | Van Manen et al. |
| 7,715,986 | B2 | 5/2010 | Nemeth et al. |
| 7,725,266 | B2 | 5/2010 | Sirgue et al. |
| 7,791,980 | B2 | 9/2010 | Robertsson et al. |
| 7,835,072 | B2 | 11/2010 | Izumi |
| 7,840,625 | B2 | 11/2010 | Candes et al. |
| 7,940,601 | B2 | 5/2011 | Ghosh |
| 8,121,823 | B2 | 2/2012 | Krebs et al. |
| 8,248,886 | B2 | 8/2012 | Neelamani et al. |
| 8,428,925 | B2 | 4/2013 | Krebs et al. |
| 8,437,998 | B2 | 5/2013 | Routh et al. |
| 8,547,794 | B2 | 10/2013 | Gulati et al. |
| 8,688,381 | B2 | 4/2014 | Routh et al. |
| 8,781,748 | B2 | 7/2014 | Laddoch et al. |
| 2002/0099504 | A1 | 7/2002 | Cross et al. |
| 2002/0120429 | A1 | 8/2002 | Ortoleva |
| 2002/0183980 | A1 | 12/2002 | Guillaume |
| 2004/0199330 | A1 | 10/2004 | Routh et al. |
| 2004/0225438 | A1 | 11/2004 | Okoniewski et al. |
| 2006/0235666 | A1 | 10/2006 | Assa et al. |
| 2007/0036030 | A1 | 2/2007 | Baumel et al. |
| 2007/0038691 | A1 | 2/2007 | Candes et al. |
| 2007/0274155 | A1 | 11/2007 | Ikelle |
| 2008/0175101 | A1 | 7/2008 | Saenger et al. |
| 2008/0306692 | A1 | 12/2008 | Singer et al. |
| 2009/0006054 | A1 | 1/2009 | Song |
| 2009/0067041 | A1 | 3/2009 | Krauklis et al. |
| 2009/0070042 | A1 | 3/2009 | Birchwood et al. |
| 2009/0083006 | A1 | 3/2009 | Mackie |
| 2009/0164186 | A1 | 6/2009 | Haase et al. |
| 2009/0164756 | A1 | 6/2009 | Dokken et al. |
| 2009/0187391 | A1 | 7/2009 | Wendt et al. |
| 2009/0248308 | A1 | 10/2009 | Luling |

(56) References Cited

U.S. PATENT DOCUMENTS

| | | |
|---|---|---|
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1* | 1/2010 | Krebs .............. G01V 1/28 166/369 |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1* | 1/2011 | Krebs .............. G01V 1/282 166/369 |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1* | 9/2011 | Krebs .............. G01V 1/282 703/2 |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1* | 11/2011 | Tan .............. G01V 1/282 703/2 |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1* | 3/2012 | Routh .............. G01V 1/28 166/369 |
| 2012/0073825 A1* | 3/2012 | Routh .............. G01V 1/28 166/369 |
| 2012/0082344 A1 | 4/2012 | Donoho |
| 2012/0143506 A1* | 6/2012 | Routh .............. G01V 1/282 702/2 |
| 2012/0143575 A1* | 6/2012 | Imhof .............. G01V 11/00 703/2 |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1* | 9/2013 | Krebs .............. G01V 1/005 702/14 |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2011/160201 | 12/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Yang et al, Quasi-Orthogonal sequences for code-division multiple access systems, IEEE transactions of information theory, vol. 16, No. 3, May 2000. p. 982-993.*

Godwin, Jeff, and Paul Sava. "A comparison of shot-encoding schemes for wave-equation migration." Geophysical Prospecting 61, No. s1 (2013): 391-408.4.*

Jim Lambers, MAT lecture 3 note, Fall 2013-2014 p. 1-5.*

Math111_ Linear Algebra, Fall 2006 https://www.math.ust.hk/~mabfchen/Math111/Week13-14.pdf (Year: 2006).*

ResearchGate Discussion, Mehdi Delkhosh https://www.researchgate.net/post/If_the_inner_product_of_two_matrices_is_zero_what_does_that_mean (Year: 2015).*

K. Abed-Meraim, S. Attallah, A. Chkeif, and Y. Hua, Orthogonal Oja Algorithm, IEEE Signal Processing Letters, vol. 7, No. 5, May 2000 (Year: 2000).*

U.S. Appl. No. 14/329,431, filed Jul. 11, 2014, Krohn et al.

U.S. Appl. No. 14/330,767, filed Jul. 14, 2014, Tang et al.

Godwin, J. et al., "A comparison of shot-encoding schemes for wave-equation migration," *Geophysical Propsecting* 61(Supp. 1), pp. 391-408, 2013.

Krebs, J.R. et al., "Fast full-wavefield seismic inversion using encoded sources," *Geophysics* 74(6), pp. WCC177-WCC188, Nov.-Dec. 2009.

Tarantola, A., "Inversion of seismic reflection data in the acoustic approximation," *Geophysics* 49(8), pp. 1259-1266, Aug. 1984.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods Volume I—Chapter 7—Surface Waves in a Vertically Heterogenous Medium," W.H. Freeman and Co., pp. 259-318.

Aki, K. et al. (1980), "Quantitative Seismology: Theory and Methods Volume I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

(56) References Cited

OTHER PUBLICATIONS

Barr, F.J. et al. (1989), "Attenuation of Water-Column Reverberations Using Pressure and Velocity Detectors in a Water-Bottom Cable," 59$^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transform," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73$^{rd}$ EAGE Conference, *Abstract*, pp. F026.

Choi, Y et al. (2012), "Application of multi-source waveform inversion to marine stream data using the global correlation norm," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," Geophysics 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75$^{th}$ Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

(56) References Cited

OTHER PUBLICATIONS

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70$^{th}$ Annual Meeting Expanded Abstracts*, pp. 786-789.

Kennett, B.L.N. (1991), "The removal of free surface interactions from three-component seismograms", *Geophys. J. Int.* 104, pp. 153-163.

Kennett, B.L.N. et al. (1988), "Subspace methods for large inverse problems with multiple parameter classes," *Geophysical J.* 94, pp. 237-247.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," 70$^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," *The Leading Edge*, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," *Geophysics*, 74(2):doi:10.1190/1.3074303, pp. Q1-Q16.

Moghaddam, P.P. et al. (2010), "Randomized full-waveform inversion: a dimenstionality-reduction approach," 80$^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

Van Groenestijn, G.J.A. et al. (2009), "Estimating primaries by sparse inversion and application to near-offset reconstruction," Geophyhsics 74(3), pp. A23-A28.

Van Manen, D.J. (2005), "Making wave by time reversal," SEG International Exposition and 75$^{th}$ Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain infoimation from migrated wavefield," *SEG Expanded Abstracts*21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

(56) References Cited

OTHER PUBLICATIONS

Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," *SEG Expanded Abstracts*, pp. 2107-2111.
Nocedal, J. et al. (2006), "*Numerical Optimization, Chapt. 7—Large-Scale Unconstrained Optimization,*" Springer, New York, $2^{nd}$ Edition, pp. 165-176.
Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & $72^{nd}$ Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.
Porter, R.P. (1989), "Generalized holography with application to inverse scattering and inverse source problems," In E. Wolf, editor. Progress in Optics XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multi-component OBC seismic data," *Geophysical Prospecting* 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," $73^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. p. SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.

\* cited by examiner

FWI Workflow

Sequential Gradient Computation

HARMONIC ENCODING FOR FWI

CROSS-REFERENCE TO RELATED APPLICATION

This application claims the benefit of U.S. Provisional Patent Application 62/031,096, filed Jul. 30, 2014, entitled HARMONIC ENCODING FOR FWI, the entirety of which is incorporated by reference herein.

FIELD OF THE INVENTION

This disclosure relates generally to the field of geophysical prospecting and, more particularly, to seismic data processing. Specifically, the disclosure is related to a deterministic method for selecting encoding weights for encoding individual source gathers of seismic data so that multiple encoded gathers can be simulated in a single simulation operation and used to efficiently invert the seismic data to infer a subsurface model of velocity or other physical property.

BACKGROUND OF THE INVENTION

Full-wavefield seismic inversion (FWI) estimates a subsurface model by iteratively minimizing the difference between observed and simulated data. FIG. 7A illustrates the basic idea of full wavefield inversion of seismic data. The process is iterative, with most of the time being spent during the "compute gradient" step, which includes the very time-consuming computer simulation of predicted seismic data. The computer time and resource requirements for FWI are enormous. When FWI is applied using explicit time-domain simulations and iterative methods, the computational cost is proportional to the number of sources: this is the conventional sequential FWI approach, and it is illustrated in FIG. 7B for N source gathers of data. In a significant breakthrough in seismic data inversion, Krebs et al. (*Geophysics* 74, p. wcc177, (2009), and U.S. Pat. No. 8,121,823 to Krebs, et al.) described a simultaneous-source approach whereby many (or all) of the sources are encoded and then combined into a composite encoded source to greatly reduce the computational expense. Both Krebs et al. references are incorporated herein by reference in all jurisdictions that allow it. This simultaneous-source approach is illustrated in FIG. 7C. It relies on encoding multiple source gathers of data, generating what may be called a super shot made up of a weighted sum of individual shots, where the encoding functions are the weights, and then inverting the composite or "super" shot in a single inversion/simulation. If n shots are encoded and inverted simultaneously, this results in a speed-up by a factor of n. In one embodiment of the Krebs invention, the encoding functions are chosen randomly, for example the weights are either +1 or −1 chosen with equal probability. It is also known that other probabilistically chosen weights produce similar results. However, one super shot may not contain enough information, so the sum of individually simulated super shots—each with a different set of weights—may be used, as taught in the Krebs et al. (2009) reference. Each such simulation is called a realization and it is known that as the number of realizations increases, their sum will approximate the sum of simulations with the original shots, i.e. the sequential FWI approach. But this approximation will only be exact with an infinite number of realizations.

Godwin and Sava review a number of ways to produce encoding weights, including orthogonal weight vectors, in "A comparison of shot-encoding schemes for wave-equation migration," Geophysical Prospecting, 1-18 (2013). However, they do not disclose the methods of selecting orthogonal weights that are disclosed in the following invention description. Moreover, their encoding is used for migration, which is not iterative and which does not improve the model.

There is a need for a method of choosing the weights deterministically so that realizations approximate the sequential FWI behavior as quickly as possible. The present invention satisfies this need.

SUMMARY OF THE INVENTION

In one embodiment, with reference to the flow chart of FIG. 8, the invention is an iterative method for inversion of seismic data to update a model of subsurface velocity or other physical property, wherein a plurality of encoded source gathers of data are inverted simultaneously, said method comprising:

(a) selecting a plurality of individual source gathers of the seismic data; (step 81)

(b) in a first iteration, encoding the selected gathers with weights, said weights forming components of a weight vector, and summing the encoded gathers to form a composite gather; (step 83)

(c) generating at least one realization of predicted data for the entire composite gather, wherein the predicted data are computer-simulated, using a current model, in a single forward-modeling operation, a different realization being characterized by a different weight vector; (step 84)

(d) updating the current model using the composite gather and the simulated composite gather from each of the at least one realization; (step 87)

(e) in a second iteration, repeating (b)-(d), using the updated model from the first iteration as the current model for the second iteration, resulting in a further updated model; wherein, (i) each iteration has a plurality of realizations, and the weight vectors for each realization are orthogonal to one another; or (ii) the weight vector or weight vectors for the first iteration are orthogonal to the weight vector or weight vectors for the second iteration; or both (i) and (ii). (82)

The orthogonal weight vectors are generated using a smoothly varying periodic function of the seismic shot location or a related variable. Examples include sine or cosine functions, eigenvectors of a Laplacian matrix, and Chebyshev nodes as given by the roots of Chebyshev polynomials.

As indicated in FIG. 8, there are some additional, known steps between simulating the measured data (step 84) and updating the model (step 87). The composite gathers of encoded data and the simulated predictions of these may each be summed, and a cost function computed measuring misfit between actual and model-simulated data (step 85). The gradient of the cost function may then be computed in the multi-dimensional model parameter space (step 86). Hinckley and Krebs showed that the efficient adjoint method of computing the gradient holds for multiple encoded-source gathers; see U.S. Patent Publication No. 2011/0000678, which is incorporated herein by reference in all jurisdictions that allow it. The gradient of the cost function defines a search direction for the update, and typically a line search is performed in that direction to determine the step size for the next update increment.

Simultaneous encoded source inversion assumes that every receiver is listening, i.e. is in place and recording data, for every source shot included in the super gather. Where this is not true, as for example in marine streamer surveys, the cost function will overestimate the misfit between simulated and actual data, causing the model update to be incorrect. See, for example, Routh et al., U.S. Pat. No. 8,437,998, for a discussion of the fixed-receiver assumption. This publication is incorporated herein in all jurisdictions that allow it. For a single shot gather, a computational mask may be developed that forces the simulated data to zero at non-listening receivers. As disclosed herein, an approximate mask for the composite gather may be generated from the masks for the individual source gathers. The masks are then encoded before simulation, amounting to a double encoding, and multiple mask encoding realizations may be generated using the same harmonic encoding technique as in the fixed spread case to generate sets of orthogonal encoding functions.

BRIEF DESCRIPTION OF THE DRAWINGS

The present invention and its advantages will be better understood by referring to the following detailed description and the attached drawings in which:

FIG. 5 is a black and white reproduction of original color drawings due to patent restrictions on use of color.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Fixed-Spread Acquisition Geometry.

The above-referenced simultaneous encoded-source method disclosed by Krebs et al. uses weights (Krebs called them encoding functions) that are, in a preferred embodiment of his invention, randomly chosen. By contrast, the present disclosure gives several ways to modify how these weights are chosen. In embodiments of the present invention, the weights (also called scaling constants herein) are obtained deterministically, not randomly or arbitrarily, and the weights are orthogonal relative to each other according to some inner product definition, including roots of orthogonal polynomials. Stated more precisely, a set of weights, one for each source gather in the super gather, form the components of a weight vector, and the weight vector, according to the present invention, must be orthogonal to weight vectors for other realizations of the super gather, or to weight vectors in other iteration cycles of the inversion, or both. Deterministic weights are weights that are generated according to a prescribed procedure that produces an orthogonal set, or converts a set of weights into an orthogonal set. Generating deterministic weights does not involve use of a random number generator. Specific embodiments include: eigenvectors of a graph Laplacian matrix, sine/cosine pairs, and roots of orthogonal polynomials (i.e. Chebyshev nodes as given by the roots of Chebyshev polynomials). Each of these is a deterministic choice of weights and a key to observed improvements in inversion behavior.

In many embodiments of the invention, the weight (encoding) vectors are smoothly varying, almost periodic functions of source location or some other source identification parameter. This applies to a single vector of weights, one weight for each source gather in a composite gather, selected for a single realization. Preferably, the weights assigned to individual source gathers in a composite source gather are unique, although good results may be obtained when vectors are repeated. Selecting/constructing suitable weights is described further below, including FIGS. 4 and 5.

Figure 4:
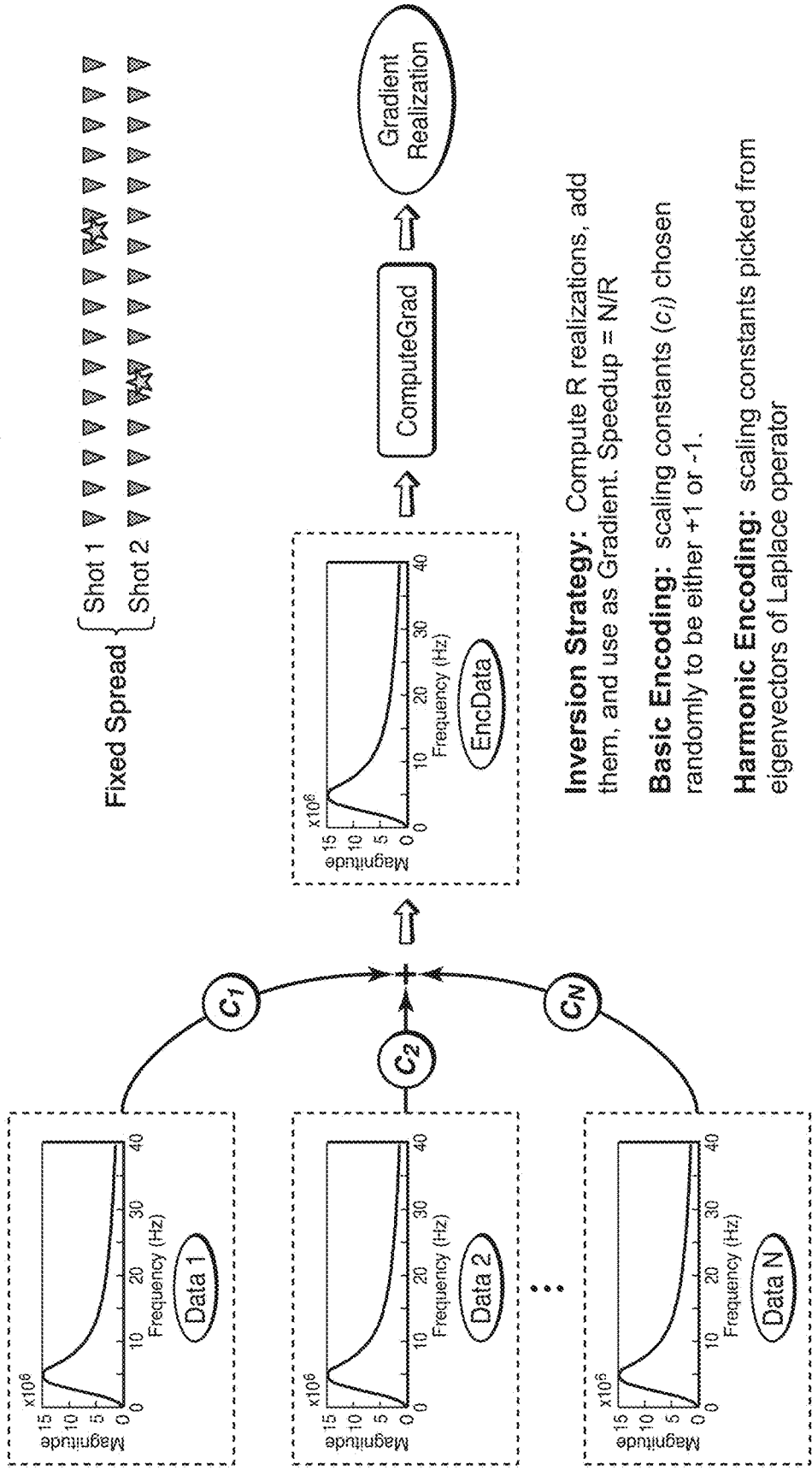
FIG. 4 is a schematic diagram illustrating the contrast between random +1/−1 source encoding and the harmonic encoding of the present invention.

FIG. 4 is a schematic diagram that illustrates the contrast between basic encoding, as described by Krebs et al., and the harmonic encoding of the present invention. In harmonic encoding, the scaling constants may be picked from eigenvectors of a Laplace operator. In practice we the Laplace operator in question may be one obtained as a Graph Laplacian (see http://en.wikipedia.org/wiki/Laplacian_matrix for a definition and discussion) matrix on the graph where nodes are sources and connections between them are defined to nearby sources (e.g., a grid defines up to four connections for each source location). The eigenvectors of such a matrix are orthogonal—inner product of any two such vectors yields zero—and that is the property is exploited in some embodiments of the present invention. The eigenvectors of a Laplace operator are called harmonic functions, which is why this encoding technique may be called Harmonic Encoding.]

Figure 5:
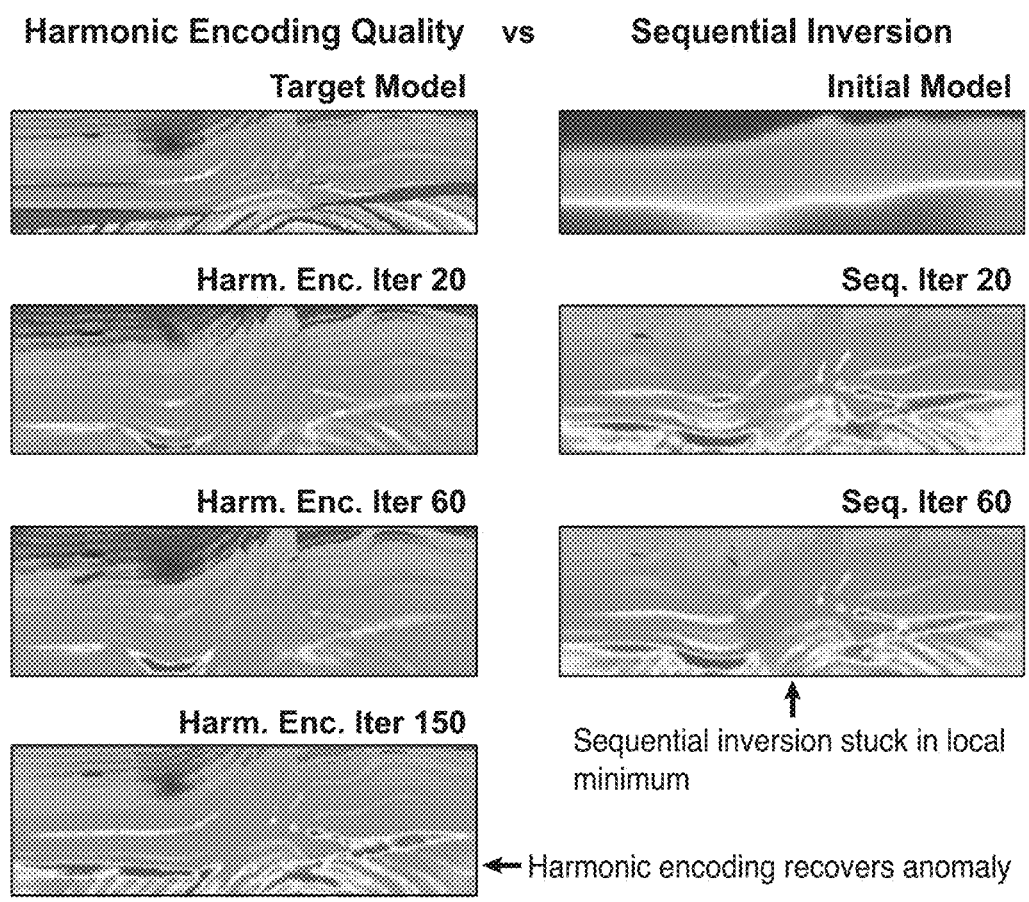
FIG. 5 illustrates an example of an advantage of harmonic encoding of the present invention over other inversion techniques, even sequential-source inversion.

FIG. 5 illustrates an example of an advantage that harmonic encoding can have over other inversion techniques. A Gaussian anomaly was introduced into a velocity model—the diffuse square in the panel "Target model." Two types of inversion are shown: Harmonic encoding on the left, and the standard (sequential) inversion on the right. The initial model is the same for both and has no information about the anomaly. Observe that the harmonic encoding approach is able to recover the anomaly and, eventually, to invert the model. By contrast, the standard (sequential) inversion fails to recover the anomaly and to converge. Although not shown here, the random encoding technique described by Krebs et al. (see FIG. 4) fails to converge as well.

Unless adjustments are made to the basic method, simultaneous encoded-source inversion assumes a fixed spread of receivers, i.e. that all receivers are "listening" to all shots. This is often not the case in actual surveys, particularly marine streamer surveys. In addition to the deterministic method for improving the multiple realization approach described briefly above (and in more detail below) for fixed-receiver geometry, the present disclosure extends this concept to non-fixed spread geometries (see FIG. 6). In the fixed spread case, the present disclosure shows how to pick weights for n shots so the result of using n realizations is identical to the sequential approach (within numerical precision). It is also explained below how to pick sets of weights optimally, so that the "best" result is obtained if only k<n realizations are generated. Additionally, at least one of the embodiments disclosed herein appears to converge faster than the random approach.

It should be noted that the benefits of orthogonal weight vectors in simultaneous encoded source inversion can be obtained with as few as one realization per iteration cycle. In this case, it is the single weight vector from each iteration cycle that must be orthogonal to the weight vectors from the other iteration cycles.

The deterministic approach of the present disclosure may be derived by generalizing the following example.

Example 1

Let there be only two sources, and define the vector of weights as $a=(a_1, a_2)$. Denote by $u_1, w_1$ the forward and adjoint wavefields (the inner product of the two at each spatial location gives the gradient) due to source 1 and $u_2, w_2$ the respective wavefields due to source 2. Much of the inversion procedure in FWI may be reduced to quadratic forms of such wavefields. Specifically, the gradient used in iterative methods for conventional sequential-source inversion requires the sum of the inner products $(u_1, w_1)+(u_2, w_2)$, each obtained by an independent simulation. By contrast, the simultaneous source simulation will produce the inner product $$(a_1 u_1 + a_2 u_2, a_1 w_1 + a_2 w_2) = \begin{matrix} a_1 a_1 (u_1, w_1) + a_1 a_2 (u_1, w_2) \\ + \\ a_2 a_1 (u_2, w_1) + a_2 a_2 (u_2, w_2) \end{matrix} \quad [\text{Eq. 1}]$$

A second realization using weights $b=(b_1, b_2)$ will produce a similar inner product where only the weights are different.

Applying [Eq. 1] to a and b, one obtains $$\begin{matrix}(a_1 u_1 + a_2 u_2, a_1 w_1 + a_2 w_2) \\ + \\ (b_1 u_1 + b_2 u_2, b_1 w_1 + b_2 w_2)\end{matrix} = \begin{matrix}(a_1 a_1 + b_1 b_1)(u_1, w_1) + (a_1 a_2 + b_1 b_2)(u_1, w_2) \\ + \\ (a_2 a_1 + b_2 b_1)(u_2, w_1) + (a_2 a_2 + b_2 b_2)(u_2, w_2)\end{matrix} \quad [\text{Eq. 2}]$$

Therefore, the sum of the two simultaneous source inner products is completely described by the sum of the matrices A and B:

$$A + B = \begin{bmatrix} a_{11} & a_{12} \\ a_{21} & a_{22} \end{bmatrix} + \begin{bmatrix} b_{11} & b_{12} \\ b_{21} & b_{22} \end{bmatrix} = \begin{bmatrix} a_{11}+b_{11} & a_{12}+b_{12} \\ a_{21}+b_{21} & a_{22}+b_{22} \end{bmatrix}$$

Observe that the sequential approach is captured here also: pick $a=(1,0)$ and $b=(0,1)$ and $$A + B = \begin{bmatrix} 1 & 0 \\ 0 & 1 \end{bmatrix}.$$

In general, when there are n sources and k realizations, one has k weight vectors denoted $a^{(i)}=(a_1^{(i)}, \ldots, a_n^{(i)})$ the effect of each of which may be described with a matrix $A^{(i)}$. The effect of summing all k realizations is therefore described by the matrix $A_k$ which, in turn, approximates the identity matrix (i.e. the sequential approach). In symbols:

$$A_k = \sum_{i=1}^{k} A^{(i)} \approx I_{n \times n}$$

The following formalizes the preceding discussion and is a direct consequence of singular value decomposition theory.

Proposition 1: Let the $a^{(i)}$ form an orthonormal set, i.e.

$$(a^{(i)}, a^{(j)}) = \begin{cases} 1 & i=j \\ 0 & i \neq j \end{cases}.$$

Then,
1. $A_k$ is the best k-realization approximation to $I_{n \times n}$, i.e. error$(k,n)=|A_k - I_{n \times n}|_{Frobenius}$ is lowest.
2. $A_n = \sum_{i=1}^{n} A^{(i)} = I_{n \times n}$.
3. At least n realizations are needed to reproduce the sequential approach exactly.

Figure 1B:
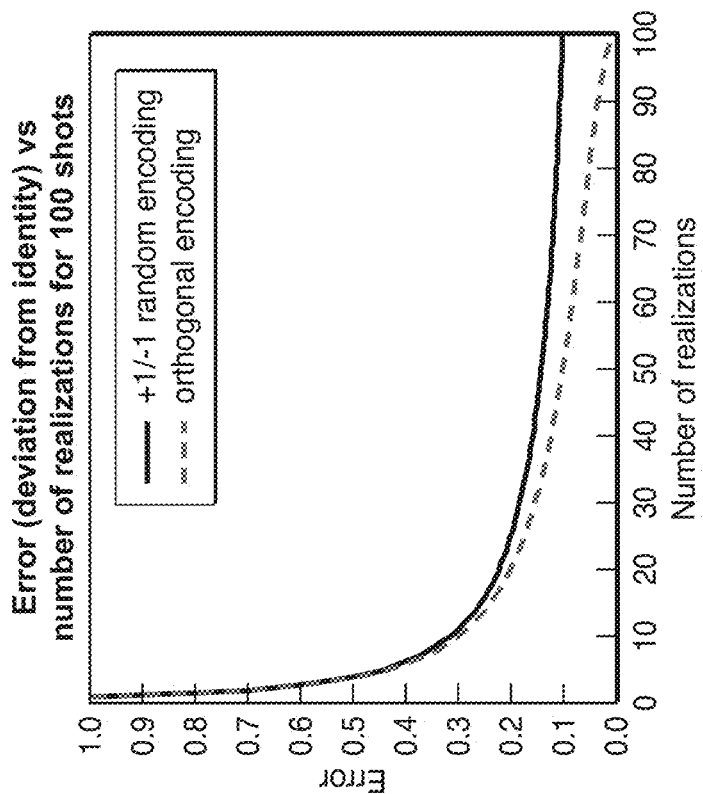
FIGS. 1A and 1B compare the error (sequential-source inversion is assumed to give the correct answer) for +1/−1 random encoding to the error for orthogonal encoding (as per the present inventive method) for fixed-spread acquisition geometry.
Figure 1A:
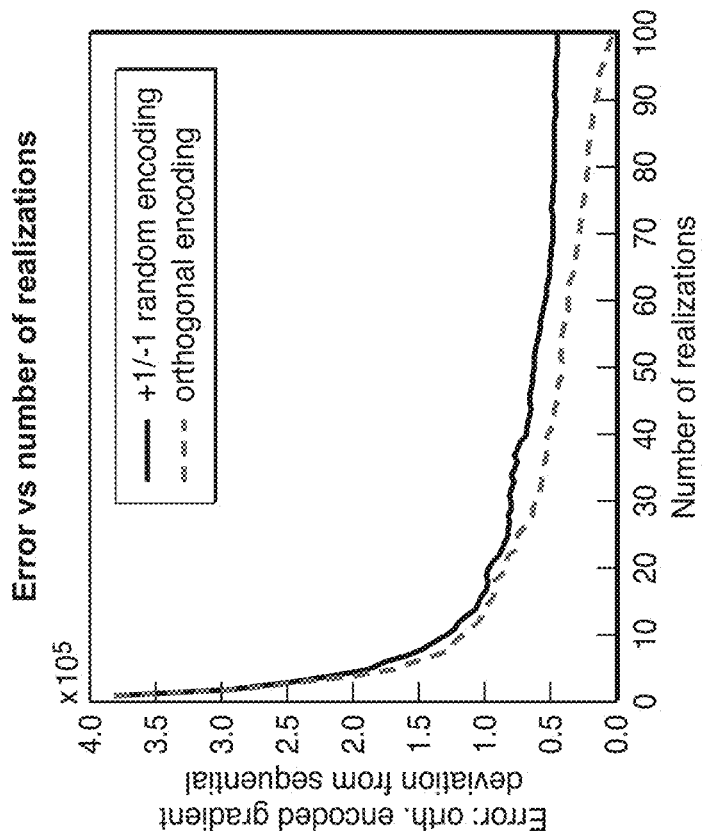

Choosing a Set of Weights for Simultaneous Source Encoding Assuming a Fixed Spread Geometry Method 1: Convert an Existing Set of Weights Using Gram-Schmidt FIGS. 1A and 1B illustrate a straightforward application of Proposition 1. The procedure consists of two steps:
1. Choose k random vectors $r^{(i)}$ each of size n with entries +1 and −1 with equal probability. Make sure that they are linearly independent.
2. Apply the Gram-Schmidt orthogonalization algorithm to the set of random vectors and produce the orthonormal set $a^{(i)}$. (http://en.wikipedia.org/wiki/Gram-Schmidt_process)

The example in FIGS. 1A and 1B used k=n in the first step. The left-hand graph in FIG. 1A shows the error according to Proposition 1 (shown is error(k,100) for k=1, . . . , 100). Random +/−1 encoding is shown by the dark solid curve. An orthognolized version of that encoding using Gram-Schmidt is shown by the lighter dashed curve. The right-hand graph in FIG. 1 B shows the error in the gradient using the same encodings. Note that the error in the left panel does not take into account the actual wavefield inner products whereas the error in the right panel does. Also, observe that after 100 realizations, the random encoding does not describe the sequential gradient exactly whereas—as expected from Proposition 1—the orthogonal version does. In addition, the error of the random encoding at 100 realizations is achieved by the orthogonal version after 50 realizations.

Method 2: Exploit Properties of Wavefield Inner Products

It can be shown that the cross-talk (noise) due to simultaneously simulating nearby sources is larger than the cross-talk due to sources that are far apart. In other words, the inner products corresponding to off-diagonal entries that are close to the diagonal are the most problematic. Thus, if we can afford k realizations, then we can group shots into clusters of k and to each cluster apply orthogonal weights vectors of length k. For example, we could pick the canonical basis for dimension k ($b^{(i)}=(0, \ldots, 1, \ldots, 0)$ where the 1 is at position i). Another approach is to apply the procedure of Method 1 to a problem of size k. Thus, the final vectors for the full problem of size n≥k consists of concatenating n/k times the vectors for the problem of size k, i.e. $a^{(i)}=(b^{(i)}, \ldots, b^{(i)})$. After k realizations there will be no cross-talk due to sources that are closer than k units apart. This "optimal-k" encoding may be randomly perturbed from iteration to iteration by multiplying the bs above by 1 or −1 chosen at random for each group. Alternatively, the perturbation may be achieved with an orthogonal set vectors with dimension equal to n/k. Additionally, the location of the 1 in the optimal-k vectors may be randomly perturbed to improve the inversion results.

Method 3: Design a Matrix of Rank N and Non-Repeating Singular Values that Approximates the Identity Matrix.

Figure 2:
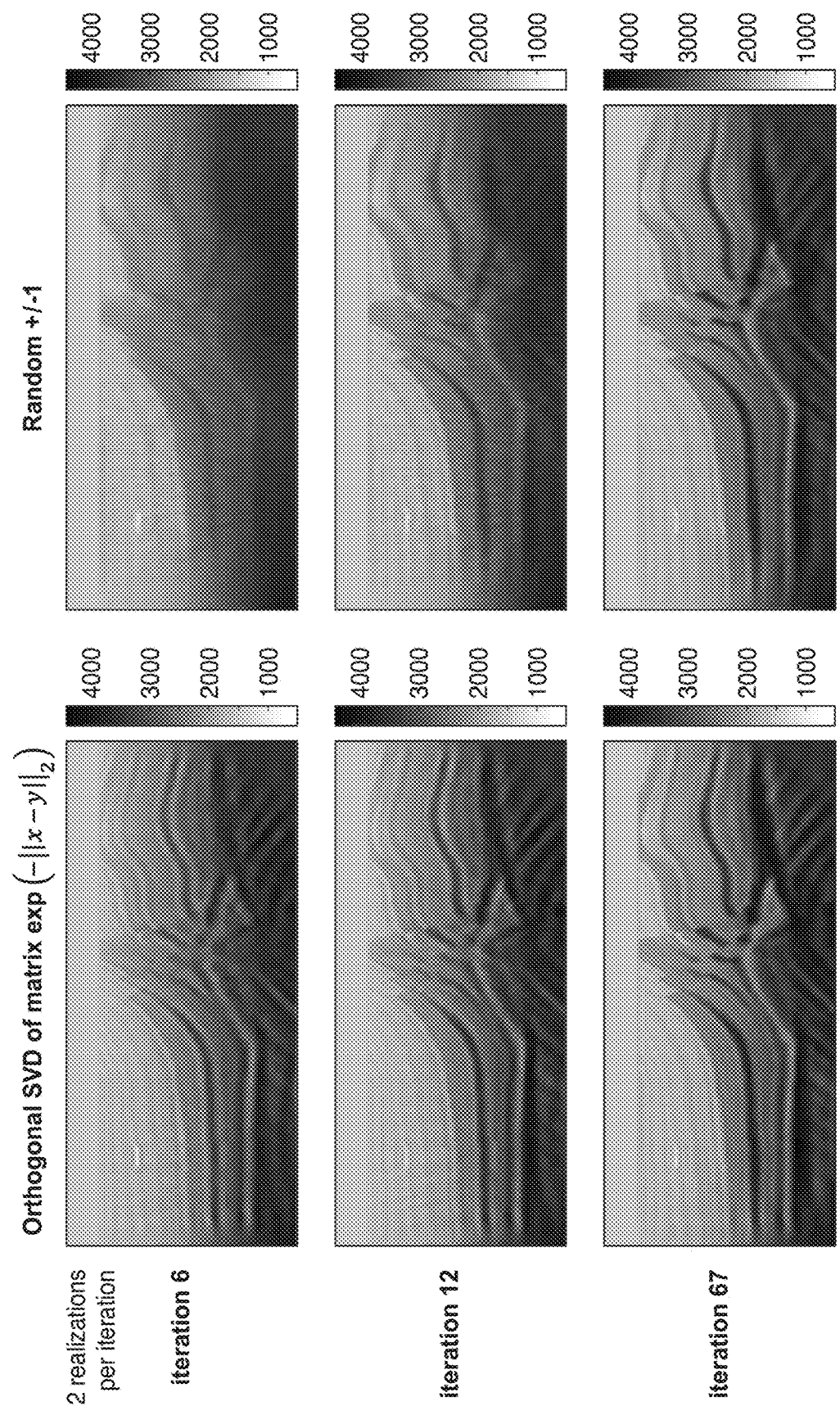
FIG. 2 compares two different encoding approaches on FWI inversion of the Marmousi velocity model—random +1/−1 encoding versus the present inventive method's orthogonal SVD matrix exp $\{-|x-y|_2\}$.
Figure 3:
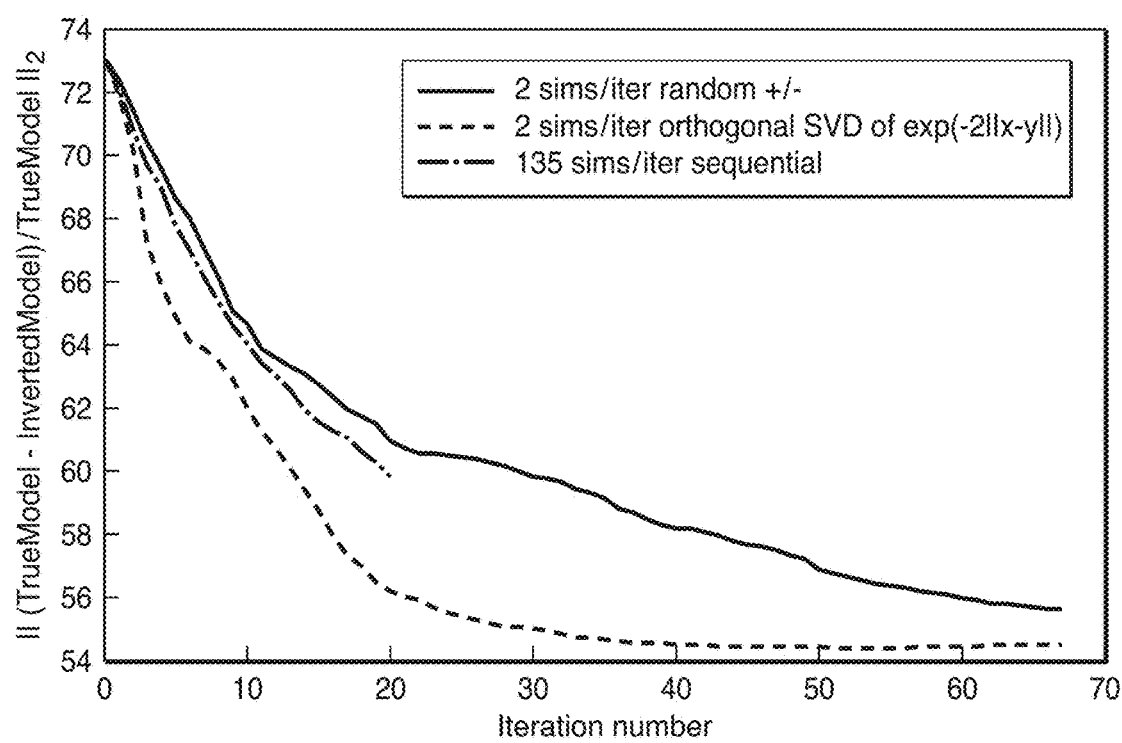
FIG. 3 furthers the comparison of FIG. 2 by showing a measure of model convergence versus iteration number for the two encoding approaches and also for conventional sequential source inversion.

A matrix M can be designed that approximates a desired behavior. For example, the identity matrix (because it represents the sequential approach) can be approximated by defining $M_{i,j}=\exp(-|loc(i)-loc(j)|)$. Applying SVD on M, one obtains an orthonormal set of weights. This choice seems to give the best results in 2D inversion tests that were run. See FIG. 2 and FIG. 3, which compare this embodiment of the present invention to random +1/−1 encoding for FWI inversion of the Marmousi velocity model. Note the faster convergence of this method compared to the random approach. Also, note that, as FIG. 5 further demonstrates, this embodiment may be preferred (faster convergence) even over the standard (sequential) FWI.

It may be noted that the eigenvectors of the example matrix given in the preceding paragraph are related to harmonic functions, i.e. eigenvectors of a Laplace operator. In some special geometries, e.g. a line graph, these eigenvectors may be obtained as sine and cosine functions as described below. In other words, the analytical expression of the eigenvectors above is given by sine and cosine functions, and so similar results are obtained by defining the weights analytically as given by sine and cosine functions. For example, if n is the number of shots along a spatial dimension, then the weights may be given by $$w = \sin\left(\frac{x}{n}\pi * k\right)$$

or by the cosine of the same arguments. Here, the argument x is an integer between 1 and n, and k is a spatial (i.e. reference) frequency for this weight. Note that it is by varying this k that different weight vectors are obtained, i.e. the ones used for independent realizations. This is a 1-D example (i.e. there is a single line of shots), but the same idea applies in 2-D: simply multiply two 1-D weight vectors. (The 2-D case needs two spatial frequencies—frequencies in space—and so we can take two 1-D vectors and then their outer product to get a matrix—i.e. 2-D distribution of weights.)

Using the above sinusoidal function as an example, experience has shown that it may be preferred to use lower frequency vectors for the first iteration of the inversion process, then progressively higher frequency vectors for each succeeding iteration. In other words, the range of k-values used for the different realizations in the first iteration would be a low range, and a progressively higher range would be used for each succeeding iteration. The next section discloses other schemes for varying (or not varying) the weights from one iteration to the next.

Using the Set of Weights in an Inversion

Given a set of weights, one can choose k vectors (one vector for each of the k realizations) to use for each iteration, but how to vary these vectors from one iteration to another decision that remains. Following are a few of the possible choices (some of which may be applied in conjunction with others). Regarding nomenclature, each vector will have n components, where each component is a weight for one of the n shots in the super (composite) gather.

1. Pick the same k vectors for each iteration.
2. Pick a different set of k vectors at random for each iteration.
3. Pick a set of k vectors that have not yet been picked in previous iterations.
    a. Choose at random from available ones.
    b. Choose in sequence: iteration i selects the $i^{th}$ group of k vectors.
4. If all vectors are exhausted:
    a. Ignore all picks and start anew.
    b. Generate a different orthogonal set using any method above.
    c. Use a random set instead of an orthogonal one.
5. Each vector in the set of k vectors may be multiplied by a random constant.
6. Any of the above methods may be used in conjunction with applying time shifts to the data.
    a. The time shift may be randomly chosen to be within a determined time window for each shot separately.
    b. The time shift as above but where the encoding is performed only for shots that have the same time shift.
    c. As in (b) but where the encoding is applied regardless of the time shift.
7. Any of the above where the shots may have already been encoded by applying frequency selection filters either prior to encoding or following the encoding.

Non-Fixed Spread Geometry (e.g., Marine Streamer).

Figure 6:
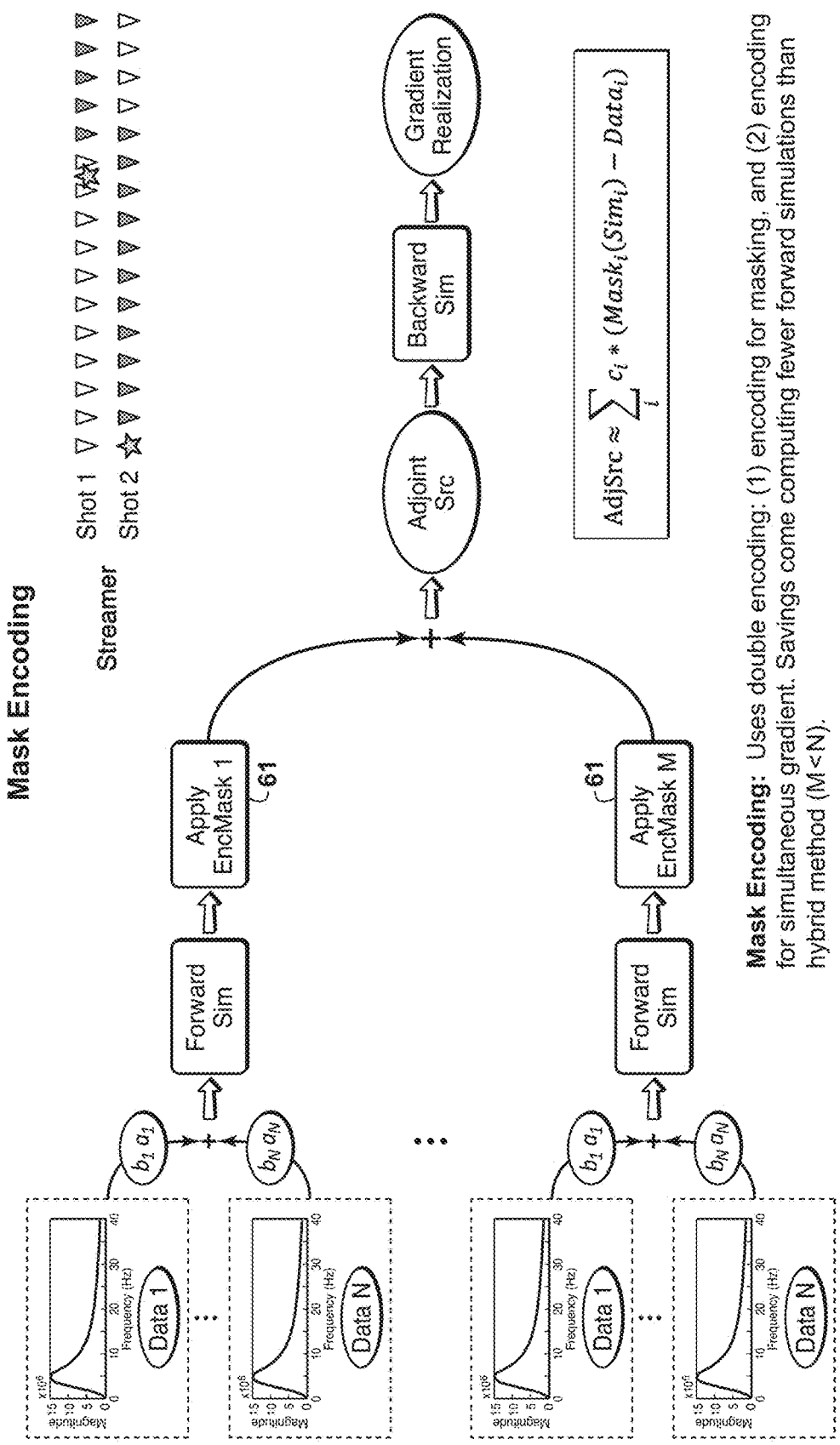
FIG. 6 is a symbolic description of the mask encoding embodiment of the present invention, designed to deal with non-fixed spread acquisition geometry.
Figure 7A:
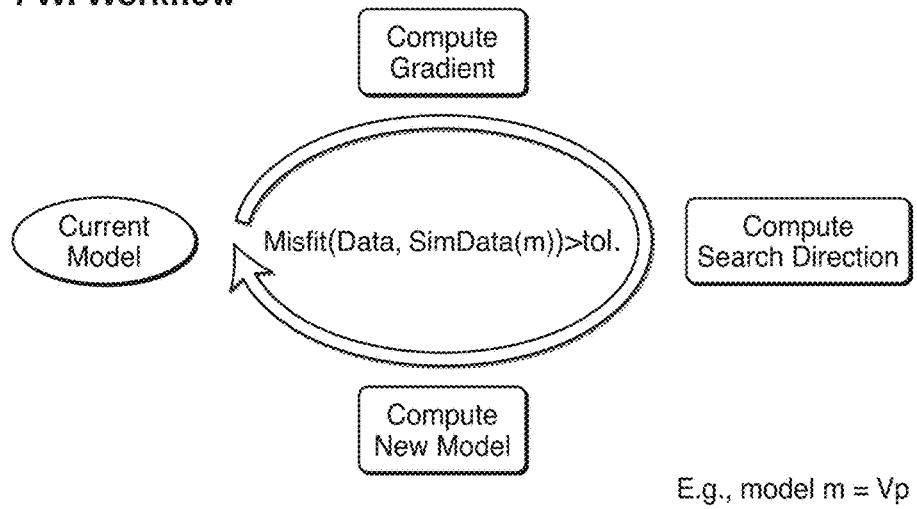
FIGS. 7A-7C are schematic diagrams that illustrate full wavefield inversion, and two alternative approaches thereto, whereby the gradient computation is done sequentially, one source at a time, versus the approach were the gradient is computed for multiple encoded sources simultaneously.
Figure 7B:
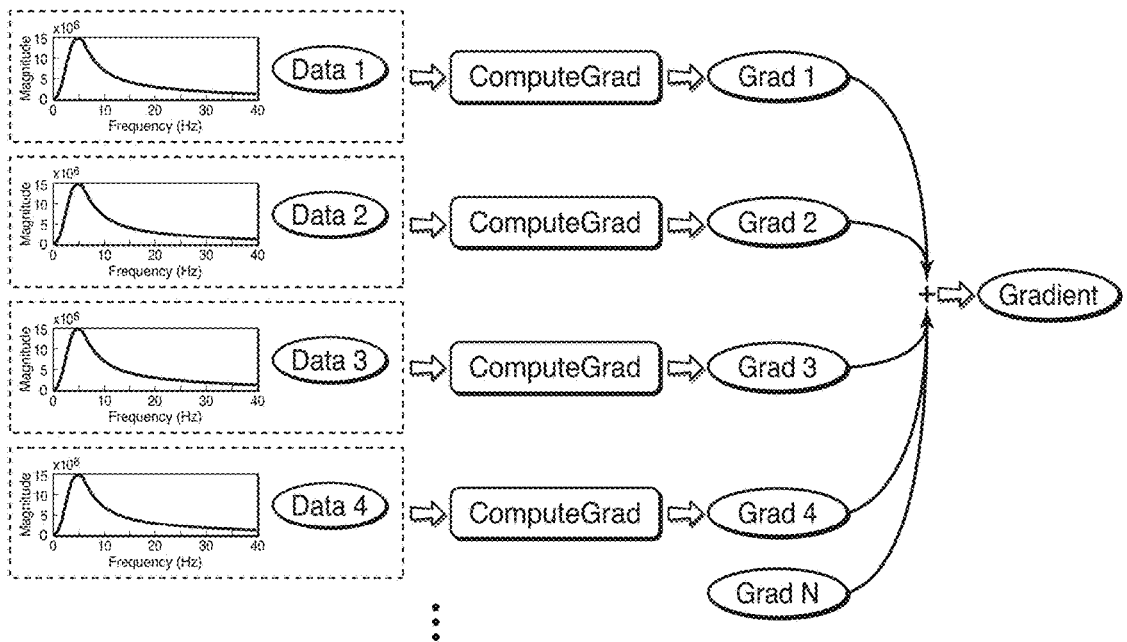
Figure 7C:
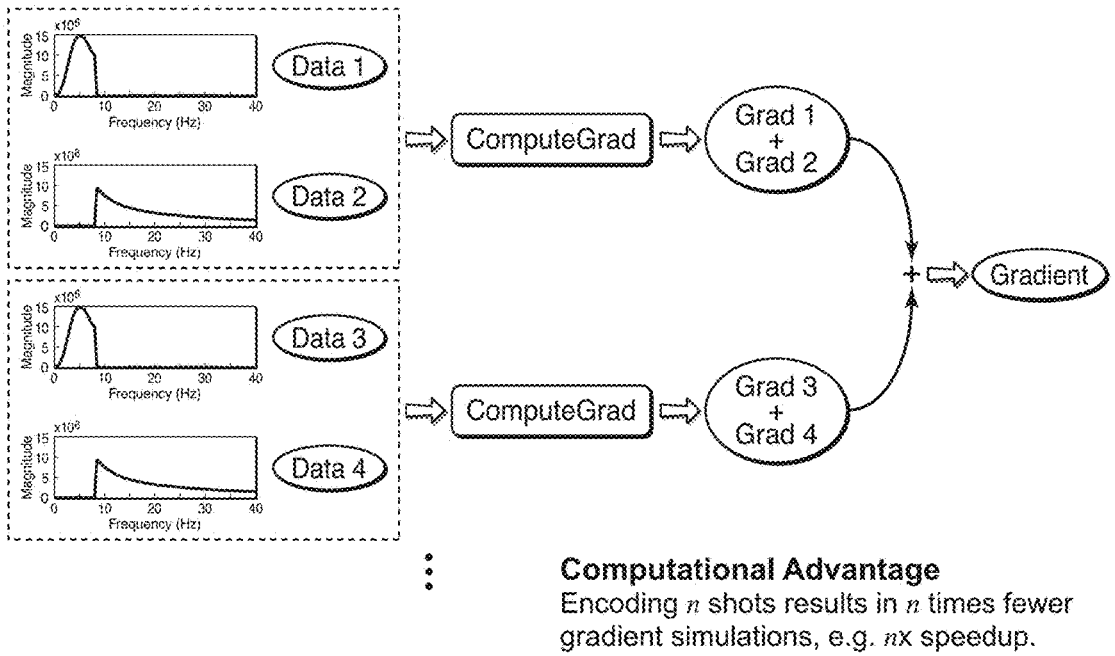
Figure 8:
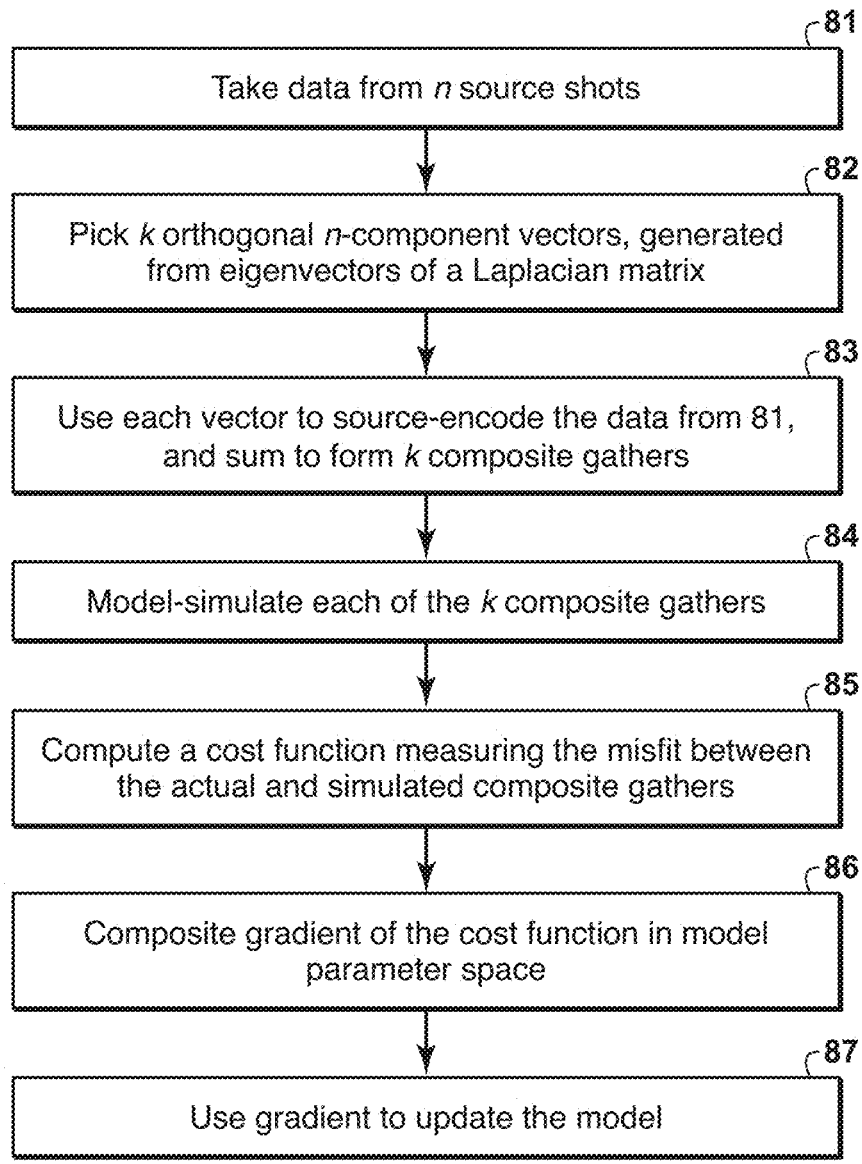
FIG. 8 is a flow chart showing basic steps in some embodiments of the present inventive method.

Mask encoding, as disclosed herein, is a deterministic method that allows encoding multiple shots and simulating them simultaneously even for a non-fixed spread acquisition geometry. FIG. 6 describes this embodiment of the present inventive method. At the top of FIG. 6, the diagram illustrates, for a simple example of two shots (denoted by stars), how only the trailing receivers (solid inverted triangles) will be recording any shot—the positions where there is no receiver for that shot (but where there is a receiver for the other shot) are the open inverted triangles. When predicted data are model-simulated using a computer, data will be simulated for all receiver locations in the composite (encoded) gather being simulated. When the residuals are computed, i.e. some measure of the difference between predicted data and corresponding measured data, the residuals corresponding to non-listening receivers will not be zero, although they should be zero. This will cause the computer cost function and the resulting model update to be incorrect. One way of preventing this is to superimpose a mask on the data for each composite gather, the mask corresponding approximately (as contrasted with a hard mask acting on each individual source gather) to the non-listening receivers for the multi-source composite gather.

If $M_i$ is the hard mask for the $i^{th}$ source gather $G_i$, and $CM_k$ is the desired composite mask for the $k^{th}$ composite gather $CG_k$, then the composite mask may be created such that $$\Sigma_i M_i * G_i \approx \Sigma_k CM_k * CG_k,$$

where the sum on the left is over all gathers in the composite gather, and the sum on the right is over all realizations the user may elect to have.

For simulation of simultaneous sources, the masks may then be encoded (61 in FIG. 6) by treating them as shots and using the same harmonic encoding technique as in the fixed spread case; this is denoted by Maski in the equation for the adjoint source in FIG. 6. (The gradient of the cost function is computed by the adjoint method in this embodiment of the invention using mask encoding; see Tarantola, A., "Inversion of seismic reflection data in the acoustic approximation," Geophysics 49, 1259-1266 (1984), which paper is incorporated herein by reference in all jurisdictions that allow it.) Then, shots are encoded as well (using the same technique but independently of the masks); the shot encoding is the ci in the equation for the adjoint source in FIG. 6. As in the fixed-spread case, to complete a cycle of the iterative inversion, more than one mask encoding realization is needed to produce a good approximation to the gradient of the cost function, i.e. to the model update. Thus, the cost is Rmasks*Rgrad number of forward simulations. In contrast, only Rgrad number of simulations is required by the fixed spread case.

In the aforementioned adjoint method, the gradient of the objective (cost) function may be computed by correlating a forward simulation time series at each model location with a backward simulation time series at the same location. The forward simulation ensues from simulating an encoded source signature (wavelet); the backward simulation ensues from an adjoint source (instead of the signature) computed in a way that depends on the choice of objective function. For example, the adjoint source for the L2 norm objective function is simply the difference between recorded data and forward simulated data, but each objective function may produce a different backward simulation source term.

Hermann and Haber (PCT Patent Application Publication WO 2011/160201) describe a method that, like the method of Krebs et al. for a fixed spread geometry, may greatly reduce the number of gradient calculations during an inversion. The key to their method is a stochastic (i.e. random choice of samples) inversion that utilizes randomly chosen weights to encode multiple shots into one together with a method that corrects for simulated data at receiver locations that do not record any data (this is the key difference between fixed spread—in which all receivers record data from all sources—and non-fixed spread—in which some receivers do not record data from some sources). By contrast, the present inventive method is totally deterministic and proceeds uses double encoding: to encode masks that perform the necessary correction as in Hermann and Haber's approach, and to encode the shots as taught herein for the fixed-spread case.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A computer-implemented iterative method for inversion of seismic data to update a model of subsurface velocity or other physical property, wherein a plurality of encoded source gathers of data are inverted simultaneously, said method comprising:
    (a) with a computer, selecting a plurality of individual source gathers of the seismic data;
    (b) in a first iteration, encoding the selected gathers with weights using the computer, said weights forming components of a weight vector, and summing the encoded gathers to form a composite gather;
    (c) generating, with the computer, at least one realization of predicted data for the entire composite gather, wherein the predicted data are computer-simulated, using a current model, in a single forward-modeling operation, a different realization being characterized by a different weight vector;
    (d) updating, with the computer, the current model using the composite gather and the simulated composite gather from each of the at least one realization;
    (e) in a second iteration, repeating (b)-(d), using the updated model from the first iteration as the current model for the second iteration, resulting in a further updated model; and
    (f) using the further updated model in prospecting for hydrocarbons;
    wherein, (i) each iteration has a plurality of realizations, and the weight vectors for each realization are orthogonal to one another; or (ii) the weight vector or weight vectors for the first iteration are orthogonal to the weight vector or weight vectors for the second iteration; or both (i) and (ii); and
    wherein the orthogonal weight vectors are generated by selecting a set of random, linearly independent vectors and applying a Gram-Schmidt orthogonalization algorithm to them to produce an orthonormal set of vectors.

2. The method of claim 1, further comprising, after (c), repeating (a)-(c), selecting source gathers in (a) that were not previously selected, and using all composite gathers and the predicted data for each composite gather to generate the model update in (d).

3. The method of claim 1, wherein the seismic data are acquired using a non-fixed spread geometry for seismic receivers, and further comprising:
    designing a mask for each source gather in the composite gather, to mask non-listening receiver locations;
    generating a mask for the composite gather from the individual source gather masks;
    encoding each composite gather mask using weights selected to form a mask weight vector that is orthogonal to mask weight vectors used for the composite gather in one or more other realizations or in one or more other iterations; and
    applying the encoded composite gather mask to the composite gather in the forward modeling of predicted data for the composite gather.

4. The method of claim 1, wherein the orthogonal weight vectors are generated from a periodic harmonic function whose period is a function of seismic shot number.

5. The method of claim 4, wherein the periodic harmonic function (w) may be represented mathematically as $$w = \sin\left(\frac{x}{n}\pi * k\right)$$

where n is the number of individual source gathers selected to form the composite source gather; x is the seismic shot number, i.e. an integer ranging from 1 to n; and k is a selected reference frequency unique to each weight vector.

6. The method of claim 5, wherein a low range of frequencies is selected from which to choose a k for each weight vector for the first iteration, and a progressively higher frequency range is used for the second and any subsequent iterations.

7. The method of claim 1, wherein weight vectors $a^{(i)} = (a_1^{(i)}, \ldots, a_n^{(i)})$ for $i=1 \ldots k$ realizations are constructed so as to minimize a selected measure of $A_k - I_{n \times n}$, where I is an identity matrix; n is the number of shots, meaning individual-source gathers, in the composite gather; $A_k = \Sigma_{i=1}^{k} 1 A^{(i)}$, where $A^{(i)}$ is a matrix given by an outer product of the weight vector $a^{(i)}$ with itself.

8. The method of claim 1, wherein updating the current model using the composite gather and the simulated composite gather comprises:
   computing a cost function measuring misfit between the composite gather and the simulated composite gather;
   computing a gradient of the cost function and model parameters phase;
   and using the gradient to update the current model.

9. The method of claim 8, wherein the gradient is computed by correlating a forward simulation time series representing the simulated composite gather with a backward simulation time series at each model location, wherein the backward simulation time series is computed from the composite gather and the simulated composite gather in a computation that depends on the cost function.

10. The method of claim 1, wherein the random vectors each have components all of which are selected from +1 and −1 with equal probability, and the random vectors are checked to ensure they are all linearly independent.

* * * * *